(12) United States Patent
Konecná et al.

(10) Patent No.: US 11,914,087 B2
(45) Date of Patent: Feb. 27, 2024

(54) RESPONSE FUNCTION OF A SCINTILLATOR (71) Applicant: SOLETANCHE FREYSSINET, Rueil-Malmaison (FR)

(72) Inventors: Ludmila Konecná, Nový Jicín (CZ); Tomás Grísa, Brno (CZ)

(73) Assignee: SOLETANCHE FREYSSINET, Rueil-Malmaison (FR)

( * ) Notice: Subject to any disclaimer, the term of this patent is extended or adjusted under 35 U.S.C. 154(b) by 107 days.

(21) Appl. No.: 17/737,152

(22) Filed: May 5, 2022

(65) Prior Publication Data
US 2022/0357472 A1 Nov. 10, 2022

(30) Foreign Application Priority Data

May 5, 2021 (EP) ..................................... 21305577

(51) Int. Cl.
G01T 1/203 (2006.01)
G01T 1/36 (2006.01)
(Continued)

(52) U.S. Cl.
CPC ............ *G01T 1/362* (2013.01); *G01T 1/2002* (2013.01); *G01T 1/203* (2013.01); *G01T 1/38* (2013.01)

(58) Field of Classification Search
CPC ....... G01T 1/362; G01T 1/2002; G01T 1/203; G01T 1/38
See application file for complete search history.

(56) References Cited

U.S. PATENT DOCUMENTS 10,429,523 B2 10/2019 Ramsden
11,255,982 B2 * 2/2022 McLaughlin, II .. G01T 1/20189
(Continued)

FOREIGN PATENT DOCUMENTS

EP 1749220 B1 10/2019
WO 2016/150935 A1 9/2016

OTHER PUBLICATIONS

Proctor, Alan "Deconvolving Plastic Scintillator Gamma-Ray Spectra Using Particle Swarm Optimization", 2020 IEEE Nuclear Science Symposium and Medical Imaging Converence (NSS/MIC), IEEE, Oct. 31, 2020, pp. 1-7.
(Continued)

*Primary Examiner* — David P Porta
*Assistant Examiner* — Fani Polyzos Boosalis
(74) *Attorney, Agent, or Firm* — Oliff PLC (57) ABSTRACT A method for generating a response function of a scintillator to incident gamma rays of energy within a range of energies of interest, the method including: obtaining the responses $\{S_i\}$ of the scintillator to a plurality of known radionuclides i (i=1, ... N), each radionuclide i emitting gamma rays with known energetic properties ($E_{ij}$, $Y_{ij}$), decomposing, for each radionuclide i, response $S_i$ into primary responses of the scintillator $S_{ij}=f(\lambda_{ij}, Y_{ij}, X_{ij})$, each primary response corresponding to the response of the scintillator to a received gamma ray of a known energy $E_{ij}$ for this radionuclide i, deriving from the primary responses $\{S_{ij}\}$ the response function $f(\lambda, X)$ of the scintillator to an incident gamma ray of any energy E within the range of energies of interest.

12 Claims, 6 Drawing Sheets (51) Int. Cl.
G01T 1/20 (2006.01)
G01T 1/38 (2006.01)

(56) References Cited

U.S. PATENT DOCUMENTS

| | | | | |
|---|---|---|---|---|
| 11,662,487 B1 * | 5/2023 | Palm | ................... | G01T 1/20181 |
| | | | | 250/252.1 |
| 11,774,628 B2 * | 10/2023 | Wang | ....................... | G01V 5/04 |
| | | | | 702/6 |
| 2008/0067390 A1 | 3/2008 | Ramsden et al. | | |

OTHER PUBLICATIONS

Oct. 19, 2021 Search Report issued in European Patent Application No. 21 30 5577.

* cited by examiner

$S_1$ - $^{241}$Am/59 keV $\quad$ $S_{21}$ - $^{133}$Ba/79 keV $\quad$ $S_{22}$ - $^{133}$Ba/81 keV $\quad$ $S_{23}$ - $^{133}$Ba/276 keV $S_{24}$ - $^{133}$Ba/302 keV $\quad$ $S_{25}$ - $^{133}$Ba/356 keV $\quad$ $S_{26}$ - $^{133}$Ba/383 keV $\quad$ $S_{31}$ - $^{57}$Co/122 keV $S_{32}$ - $^{57}$Co/136 keV $\quad$ $S_{41}$ - $^{60}$Co/1173 keV $\quad$ $S_{42}$ - $^{60}$Co/1332 keV $\quad$ $S_5$ - $^{137}$Cs/661 keV $S_6$ - $^{54}$Mn/834 keV $\quad$ $S_{71}$ - $^{22}$Na/511 keV $\quad$ $S_{72}$ - $^{22}$Na/1274 keV $\quad$ $S_{81}$ - $^{88}$Y/898 keV $S_{82}$ - $^{88}$Y/1836 keV $\quad$ $S_9$ - $^{65}$Zn/1115 keV $\quad$ $S_{10}$ - $^{203}$Hg/279 keV

RESPONSE FUNCTION OF A SCINTILLATOR

FIELD OF THE INVENTION

The present invention relates to a method for characterizing the response of a radiation detector to incident gamma radiation, in particular for a radiation detector comprising scintillating material.

BACKGROUND OF THE INVENTION

Scintillation detectors use the molecular or atomic excitation effect of an incident radiation passing through a scintillating material to detect or measure said radiation. The scintillating material, also called "scintillator", generates photons in response to the incident radiation which can be measured by a photodetector to estimate the energy deposited in the detector by the radiation. There are two main types of scintillators: inorganic and organic, the latter comprising plastic scintillators. Plastic scintillators are of particular interest when it comes to gamma radiation detection because their composition allows for a relatively short decay time and thus, fast response, while also being relatively cheap and durable.

In some situations, it is useful to not only detect a radiation, but also identify the various isotopes present in the source of the radiation. To do so, it is necessary to characterize beforehand the response of the scintillation detector to incident radiation. For a full description of a scintillator response, so-called "response matrices" or "response functions" are commonly used, which represent the response, that is, the absorbed energy spectrum, measured from the scintillator when exposed to a gamma radiation of any value of energy within a range of energies of interest.

The response function can then be used for the deconvolution of the measured signal, in order to restore information about the value(s) of energy of emission of the incident radiation, and thus help identify radioactive isotopes present in the source of the radiation.

Figure 1:
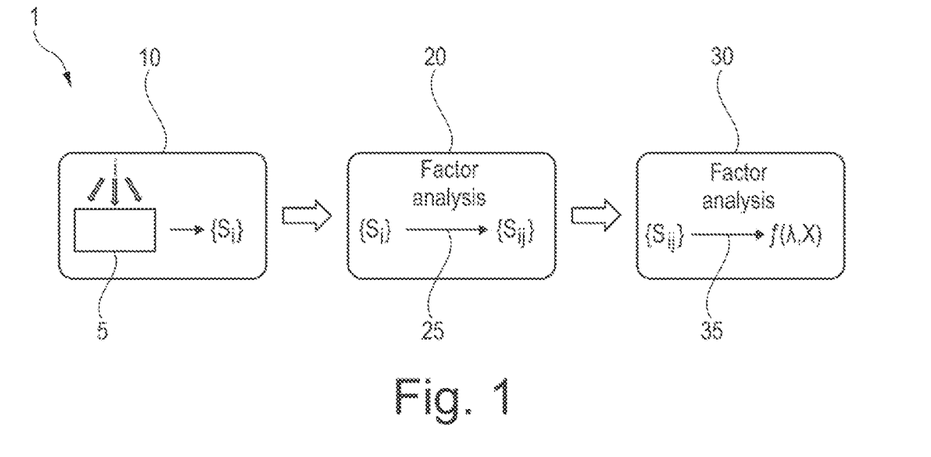
FIG. 1 is a flowchart schematically illustrating an exemplary method for generating a response function of a scintillator in accordance with the invention.

An example of a response function is represented for an inorganic NaI(Tl) detector in FIG. 1. The response of the scintillator in this example shows a single peak for each value of energy of emission considered, which makes it straightforward to identify the energy of emission of the incident radiation.

It is known to establish the response function of inorganic scintillators such as HPGe or NaI(Tl) to gamma radiation using full width half maximum (FWHM) calibration.

However, such characterization methods are relatively difficult to apply to plastic scintillators, mainly because Compton scattering is a dominant interaction between gamma photons and plastic scintillator, which broadens the absorbed energy spectrum compared to inorganic scintillator and makes it difficult to identify the energy of emission of the incident radiation.

EP1749220 discloses a method to determine the response function of a plastic scintillator using Monte Carlo simulations, or a combination of experimental measurements and Monte Carlo simulations. However, such a method requires a relatively large number of experimental measurements and/or simulations which can become too computationally expensive. Moreover, the response function obtained with this method does not include the effects of some physical phenomena such as the attenuation and scattering of scintillation light within volume of scintillator, or the effect of used electronics.

WO2016150935 discloses a method for determining the nature of the radioelements contained in an object comprising a first step in which numerical simulations are performed to model responses of a scintillator exposed to gamma radiation, and a second step in which the simulated responses are modified using nonparametric regression to fit the measured data. It is however relatively difficult to arrive at a fine modelling for plastic scintillators, and the inaccuracies in the modelling of the detector are then carried away during the second step and the reconstruction of the incident energies.

Another known approach consists in using a database of known monoenergetic radionuclides and the responses of the scintillator to those elements, the responses being experimentally measured beforehand. But to gain full understanding of the scintillator response, at least ten or fifteen different monoenergetic radionuclides should be used, which proves difficult in practical as there are just a few commonly used monoenergetic radionuclides emitting gamma rays while disintegrating.

Thus, there remains a need for an improved method of characterization of a scintillator response to an incident radiation, in particular for generating a response function of the scintillator that allows to accurately determine the values of energy of the incident radiation over a relatively large range of energies, in order to eventually identify different radionuclides present in the source of the radiation.

SUMMARY

The present invention aims to remedy to all or part of the deficiencies of the prior art mentioned above and embodiments of the invention relate to a method for generating a response function of a scintillator to incident gamma rays of energy within a range of energies of interest, the method comprising:

(a) Obtaining the responses $\{S_i\}$ of the scintillator to a plurality of known radionuclides $\{i, i=1, \ldots N\}$, each radionuclide i emitting gamma rays with known energetic properties $(E_{ij}, Y_{ij})$, (b) Decomposing, for each radionuclide i, said response $S_i$ into primary responses of the scintillator $S_{ij}=f(\lambda_{ij}, Y_{ij}, X_{ij})$, each primary response corresponding to the response of the scintillator to a received gamma ray of a known energy $E_{ij}$ for this radionuclide i, (c) Deriving from the primary responses $\{S_i\}$ the response function $f(\lambda, X)$ of the scintillator to an incident gamma ray of any energy E within the range of energies of interest.

The response function obtained with the method of the present invention fully characterizes the response of any scintillator of a given geometry, including a plastic scintillator of large volume.

By "range of energies of interest", it is meant that the range should comprise at least the energies which the scintillator is expected to be exposed to within the scope of its application as a radiation detector.

The range of energies of interest may be larger than [60 keV-1500 keV], better larger than [50 keV-2000 keV], even better larger than [40 keV-3072 keV].

The method is based on the response $\{S_i\}$ of the scintillator to the plurality of known radionuclides $\{i, i=1, \ldots N\}$, from which a complete response function $f(\lambda, X)$ can be computed, $f(\lambda, X)$ representing the response of the scintillator to incident gamma rays of any energy E within the range mentioned above.

The responses $\{S_i\}$ of the scintillator to the plurality of known radionuclides $\{i, i=1, \ldots N\}$ may be obtained in different ways.

The responses $\{S_i\}$ are for instance obtained experimentally by exposing the scintillator to be characterized to each known radionuclide i and measuring the absorbed energy spectrum from the scintillation.

Preferentially, at least one response $S_i$ may be obtained in step (a) through direct experimental measurement.

The known radionuclides can be monoenergetic, meaning that the gamma rays emitted during deexcitation of the nucleus following a decay event all have the same energy $E_i$. Alternatively, gamma rays of different energies can be emitted during deexcitation; the occurrence of each gamma radiation of a given energy $E_{ij}$ per radionuclide i is represented by the radiation yield $Y_{ij}$.

Hence, in the present invention, the known energetic properties of the gamma rays of a radionuclide i preferentially comprise the possible values of energy $E_{ij}$ at which the gamma rays can be emitted, and for each energy value $E_{ij}$, the corresponding yield $Y_{ij}$.

From the known energetic properties and from the measured spectra obtained in step (a), a response $S_{ij}$ for each gamma radiation of a given energy $E_{ij}$ per radionuclide i is computed in step (b), denoted 'primary response' hereafter.

Preferably, the response $\{S_i\}$ is decomposed in step (b) through a factor analysis method. In particular, the decomposition of the responses $\{S_i\}$ at step (b) may comprise:

Via factor analysis, determining, for each monoenergetic or pseudo-monoenergetic radionuclide i of the plurality of radionuclides, at least one correlation coefficient $\lambda_i$ between the response $S_i$ of the scintillator to said radionuclide i and the factors, $\lambda_i$ depending on the energy $E_i$ at which gamma rays are emitted by said radionuclide i, computing, by interpolation of the coefficients $\{\lambda_i\}$, at least one correlation coefficient $\lambda_{ij}$ for each value of energy $E_{ij}$ at which gamma rays are emitted by a radionuclide i, where $j=1, \ldots, P$ with P being the number of possible values of energies for radionuclide i, determining, for each radionuclide i at least one model component $X_{ij}$, representing the response of the scintillator for each value of energy $E_{ij}$ at which gamma rays are emitted by a radionuclide i, $X_{ij}$ being preferentially determined by regression analysis of the responses of the scintillator to monoenergetic or pseudo-monoenergetic radionuclides and/or other primary responses with similar energy, determining, for each radionuclide i, from coefficients $\lambda_{ij}$, the decomposition of the signal $S_i$ into primary responses $S_{ij}=f(\lambda_{ij}, Y_{ij}, X_{ij})$.

A radionuclide is designated here as "pseudo-monoenergetic" when the gamma rays emitted all have similar values of energies. For instance, Cobalt-60 ($^{60}$Co) is considered as a pseudo-monoenergetic radionuclide as it undergoes beta decay which is followed by the emission of two gamma rays with energies 1173.2 keV and 1332.5 keV.

Preferably, M correlation coefficients $\{\lambda_{ij,k}: k=1, \ldots, M\}$ are determined for each value of energy $E_{ij}$ at which gamma rays are emitted by a radionuclide i, M being greater than 1, M being preferentially equal to 3, which improves the resolution of the response function.

Similarly, M model components $\{X_{i,k}: k=1, \ldots, M\}$ are determined for each radionuclide i, M being the same as for the correlation coefficients $\{\lambda_{ij,k}: k=1, \ldots, M\}$.

The accuracy of the response function compared to the real response of the detector depends on the number of primary responses obtained. As there are only a few known monoenergetic radionuclides, it is usually difficult to obtain enough primary responses to constitute an accurate model.

The method according to the present invention makes it possible to substantially increase the number of primary responses available to compute a full response function.

The plurality of known radionuclides may be chosen as to obtain after step (b) at least 15 different primary responses $\{S_{ij}\}$ of the scintillator, better at least 17, better at least 19.

In some embodiments, the response function $f$ may also be determined in step (c) using a factor analysis method, following a similar process as for step (b).

Another aspect of the invention relates to a method for determining the energy distribution of an incident gamma radiation, the method comprising:

Providing a plastic scintillator comprising a response function determined beforehand according to the method defined above, Measuring the response of the scintillator when exposed to the incident gamma radiation, Performing a deconvolution of the measured response using the response function of the scintillator, the deconvolution process generating an output energy spectrum representative of the energy distribution of the gamma radiation.

The method may further comprise identifying at least one radionuclide present in the source of the incident gamma radiation based on at least one peak of the output energy spectrum representative of an energy value at which the incident gamma radiation can be emitted for the at least one radionuclide.

Such a method brings possibilities for NORMS/MEDICAL/INDUSTRY radionuclides identification, which is advantageous in many applications, for instance for radiation portal monitors where radionuclide groups must be identified to reduce false alarms.

With standard data evaluation, such discrimination with plastic scintillators is relatively difficult.

The method of the present invention brings accurate information about the energy distribution of the incident radiation entering a plastic scintillator, even a high volume one, and therefore provides the necessary elements for such discrimination/identification.

Yet another aspect of the invention relates to a radiation detector comprising:

A sensor comprising a plastic scintillator producing photons when interacting with gamma radiation, At least one photodetector arranged to detect the photons produced by the plastic scintillator and generate a signal representative of the response of the detector to the gamma radiation, A memory storing data representative of a response function of the scintillator, said response function resulting from the method of the invention as defined above, and, A processor using said data to perform a deconvolution of the signal received by the photodetector and generate a deconvoluted signal representative of the energy distribution of the gamma radiation.

BRIEF DESCRIPTION OF THE FIGURES

For a more complete understanding of the present invention, a description will now be given of several examples, taken in conjunction with the accompanying drawings, in which.

DETAILED DESCRIPTION

An exemplary method 1 for generating a response function of a scintillator is represented in a simplified manner in FIG. 1. The method 1 comprises three steps 10, 20 and 30 which correspond to the steps (a), (b) and (c) described above, respectively.

In the following, an example of application of the method 1 is given for generating the response function $f(\lambda, X)$ of a detector 5 comprising a plastic scintillator using the plurality of known radionuclides $\{i, i=1, \ldots N\}$ described in Table 1 below, which comprises 10 (N=10) different radionuclides.

The radionuclides used in this example can be monoenergetic (j=1), such as Am-241, Cs-137, Mn-54, Zn-65 and Hg-203, pseudo-monoenergetic, such as Co-57 and Co-60, or can emit gamma rays with distinct values of energy, such as Ba-133, Na-22 and Y-88.

TABLE 1

| Nuclide i /Energy line j | Nuclide | Energy $E_{ij}$ [keV] | Yield $Y_{ij}$ [%] |
|---|---|---|---|
| 1/1 | Am-241 | 59.5 | 36.3 |
| 2/1 | Ba-133 | 79.6 | 2.5 |
| 2/2 | Ba-133 | 81 | 33 |
| 2/3 | Ba-133 | 276.4 | 6.9 |
| 2/4 | Ba-133 | 302.8 | 17.8 |
| 2/5 | Ba-133 | 356 | 60 |
| 2/6 | Ba-133 | 383.9 | 8.7 |
| 3/1 | Co-57 | 122.1 | 85.5 |
| 3/2 | Co-57 | 136.5 | 10.6 |
| 4/1 | Co-60 | 1173.2 | 100 |
| 4/2 | Co-60 | 1332.5 | 100 |
| 5/1 | Cs-137 | 661.7 | 85.1 |
| 6/1 | Mn-54 | 834.8 | 100 |
| 7/1 | Na-22 | 511 | 180.7 |
| 7/2 | Na-22 | 1274.5 | 99.9 |
| 8/1 | Y-88 | 898 | 93.4 |
| 8/2 | Y-88 | 1836 | 99.4 |
| 9/1 | Zn-65 | 1115.5 | 50.8 |
| 10/1 | Hg-203 | 279.2 | 81 |

As illustrated in FIG. 1, in step 10, a detector 5 comprising a plastic scintillator is exposed to each individual radionuclide i of Table 1 emitting gamma rays of energies $E_{ij}$. The response $S_i$ of the detector 5 to the gamma radiation, i.e. the absorbed energy spectrum, is measured from the scintillation generated by the scintillator.

Figure 2:
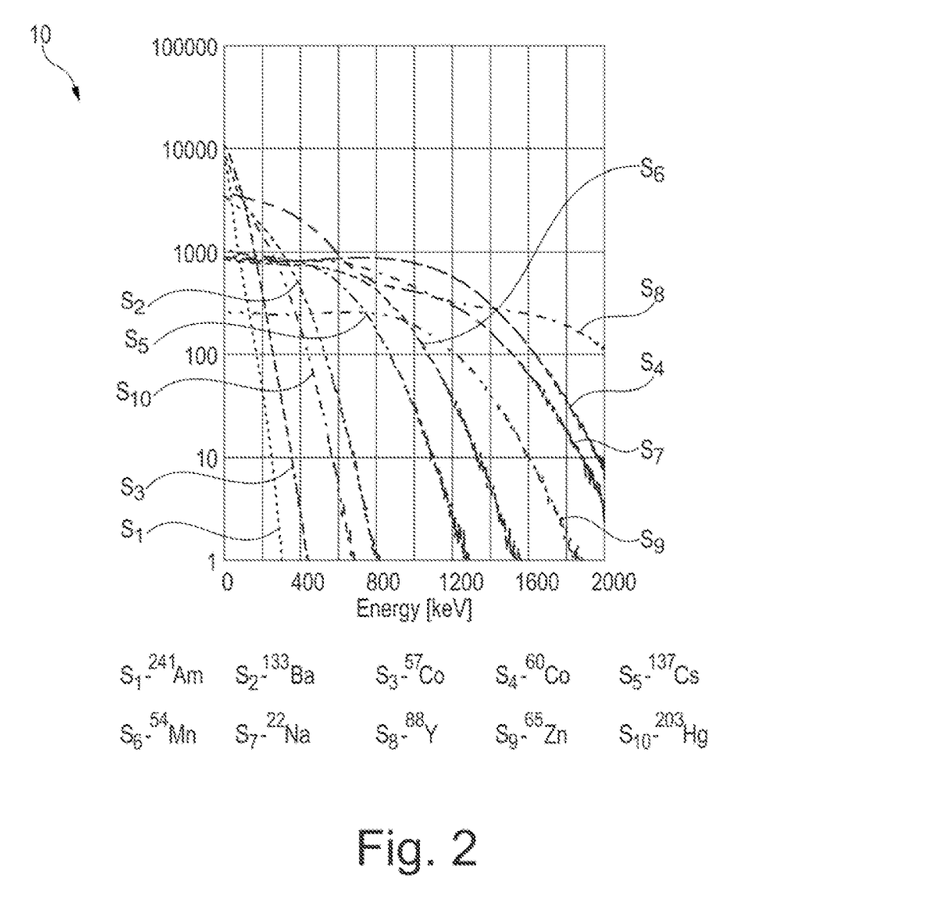
FIG. 2 is a graph illustrating an example of responses $\{S_{ij}\}$ of the scintillator obtained in the first step of the method of FIG. 1.

All of the responses $\{S_i\}$ measured in step 10 are represented on the graph in FIG. 2.

In the case of a plastic scintillator, as in the example considered, the responses $\{S_i\}$ do not show full energy peaks but Compton edges more or less broadened, depending on the design of the detector.

Figure 9:
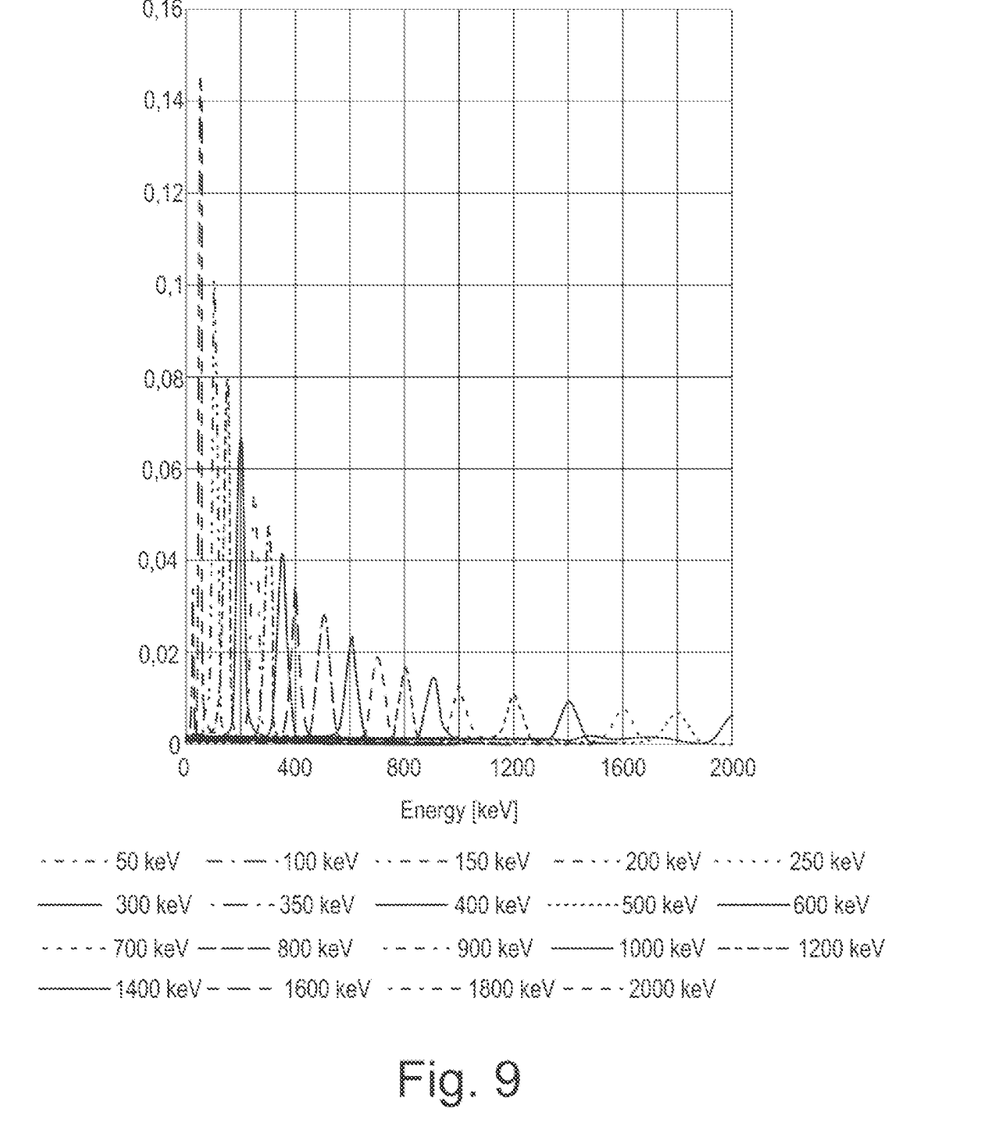

In contrast to the responses obtained with a Na (Tl) detector (as illustrated in FIG. 9), the responses $\{S_i\}$ of a plastic scintillator offer a relatively poor signature from which the particular gamma ray emission can be readily identified.

The present invention allows to generate a full response function which provides the necessary elements for such identification.

In step 20, the measured responses $\{S_i\}$ of FIG. 2 are used in combination with the known energetic properties ($E_{ij}$, $Y_{ij}$) or the radionuclides to compute the primary responses $\{S_{ij}\}$ of the scintillator.

Each primary response $S_{ij}$ represents the response of the scintillator to a received gamma ray of a known energy $E_{ij}$ for a radionuclide i.

Hence, the number of primary responses obtained in step 20 is the number of different values of energy at which gamma rays can be emitted for the plurality of radionuclides, which corresponds, in the example considered, to the number of lines in Table 1, that is, 19.

The 19 different values of energy are denoted "energy lines" in the following.

Figure 3:
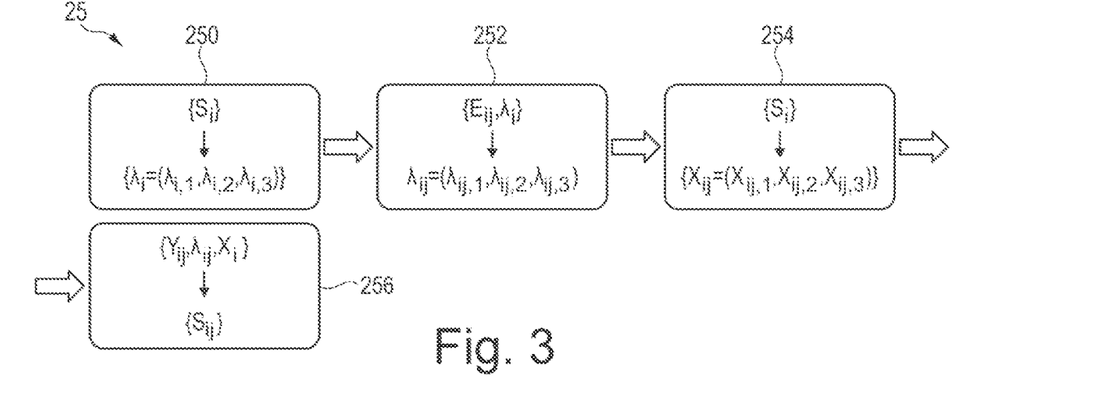
FIG. 3 is a flowchart schematically illustrating further details of the second step of the method of FIG. 1.

A method 25 to decompose the measured responses $\{S_i\}$ into primary responses $\{S_{ij}\}$ is illustrated in more details in FIG. 3.

In the example considered, Am-241, Cs-137, Mn-54, Zn-65, and Hg-203 are monoenergetic nuclides, so the measured responses $\{S_i\}$ of the scintillator to theses nuclides are primary responses per se and do not need to be decomposed.

The responses $\{S_i\}$ of the scintillator to Co-57, Co-60 Ba-133, Na-22 and Y-88 need to be decomposed into primary responses $\{S_{ij}\}$ since those nuclides present multiples energy lines.

The decomposition method comprises for instance the following steps:

In step 250, for each monoenergetic or pseudo-monoenergetic nuclide, i.e., for Am-241, Cs-137, Mn-54, Zn-65, Hg-203, Co-57 and Co-60, a set of three correlation coefficients $\lambda_i = (\lambda_{i,1}, \lambda_{i,2}, \lambda_{i,3})$, also called "factor loadings", are determined.

The determination of $\lambda_i$ is done using a factor analysis method, a method known in the art, described for instance in the book from Esbensen et. al "Multivariate Data Analysis: In Practice: an Introduction to Multivariate Data Analysis and Experimental Design", 5th ed. CAMO, 2002.

In the present example, there are three factor loadings $\lambda_i = (\lambda_{i,1}, \lambda_{i,2}, \lambda_{i,3})$.

In step 252, the sets of factors loadings $\{\lambda_i\}$ are interpolated to compute a set of factors loadings $\lambda_{ij} = (\lambda_{ij,1}, \lambda_{ij,2}, \lambda_{ij,3})$ for each energy line j of the nuclides Ba-133, Na-22 and Y-88. The factor loading $\lambda_{ij}$ depends on $E_{ij}$.

In step 254, a set of three model components $X_{ij}=(X_{ij,1}, X_{ij,2}, X_{ij,3})$ is computed for each primary response $\{S_{ij}\}$ which is to be obtained.

$X_{ij}$ may be determined by regression analysis using the responses of the scintillator to monoenergetic radionuclides which are the "closest" to the response to be decomposed. The same component $X_{ij}=X_i$ can be used for the pseudo-monoenergetic nuclides.

For instance, to compute $X_3=(X_{3,1}, X_{3,2}, X_{3,3})$, which is the set of model components for the response $S_3$ of the scintillator to the nuclide $^{57}$Co, the measured spectra $S_1$ from $^{241}$Am and $S_{10}$ from $^{203}$Hg are used. As it can be seen in FIG. 2, $S_1$ and $S_{10}$ are the spectra the closest to the spectrum $S_3$.

The model component $X_{ij}$ can also be computed using primary responses already decomposed.

In step 256, the responses $\{S_i\}$ are decomposed into primary responses $\{S_{ij}\}$ for each energy $E_{ij}$ using the precomputed parameters $\lambda_{ij}$ and $X_i$, and the yields $Y_{ij}$.

For instance, for the nuclide $^{57}$Co, the spectrum $S_3$ is decomposed into two sub spectra $S_{31}$ and $S_{32}$ corresponding to the energies $E_{31}=122.1$ keV and $E_{32}=136.5$ keV, respectively.

These sub spectra are given by:

$$S_{31} = S(^{57}Co_{122.1}) = f(\lambda_{31}, Y_{31}, X_3) = \sum_{k=1,\ldots,3} \lambda_{32,k} Y_{32} X_{3,k}$$

$$S_{32} = S(^{57}Co_{136.5}) = f(\lambda_{32}, Y_{32}, X_3) = \sum_{k=1,\ldots,3} \lambda_{32,k} Y_{32} X_{3,k}$$

Figure 4:
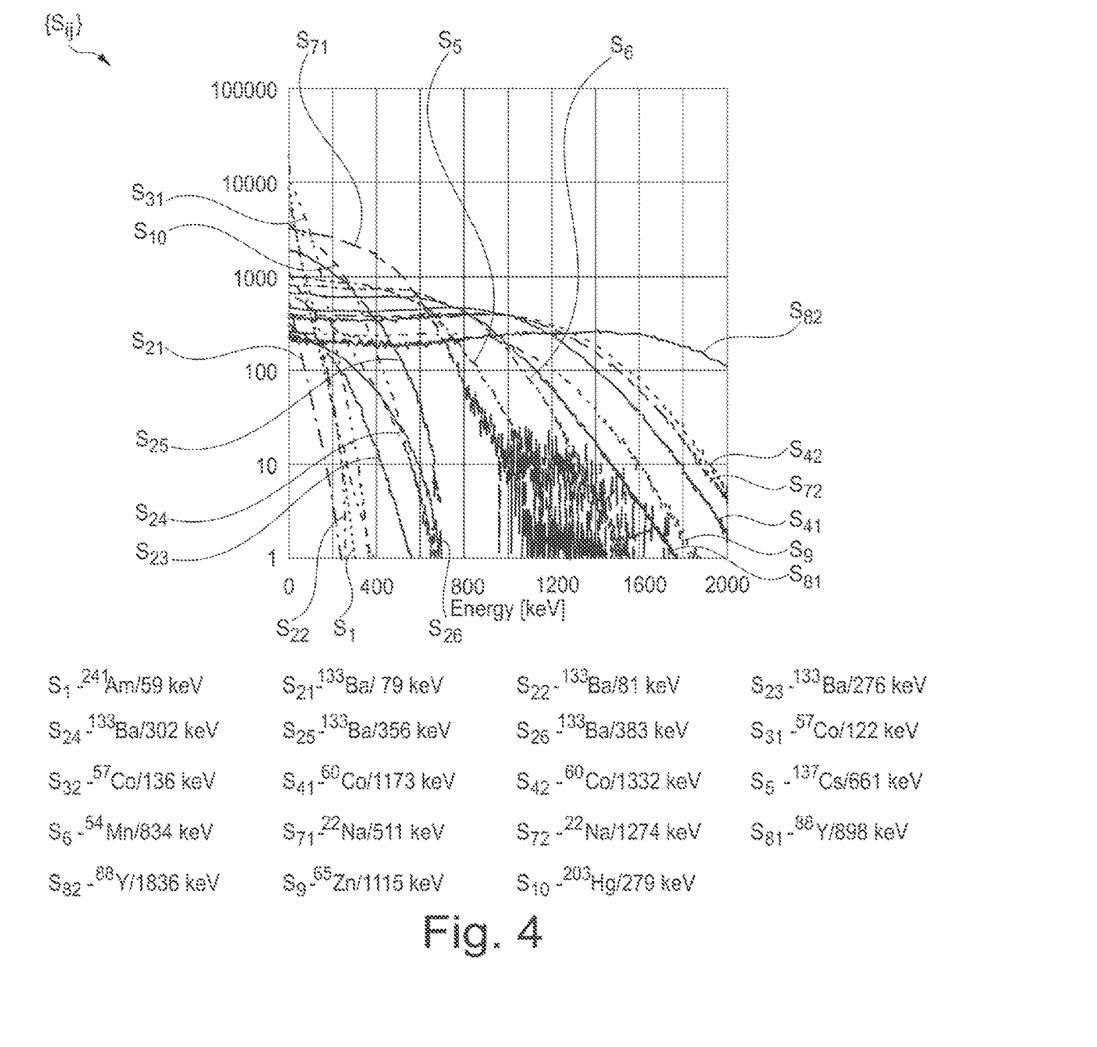
FIG. 4 is a graph illustrating an example of primary responses $\{S_{ij}\}$ determined in the second step of the method of FIG. 1.

The result of the decomposition 20 into primary responses $\{S_{ij}\}$ is shown in the graph of FIG. 4. The number of lines has been increased to 19, starting from 10 measured responses, which constitutes a rich base from which the full response function can be generated.

The response function $f(\lambda, X)$ is generated in step 30 to determine the response of the scintillator to any gamma ray emission of energy E.

In the example considered, the energies $\{E_{ij}\}$ for which the responses $\{S_{ij}\}$ have been obtained, range from 59 keV to 1836 keV.

The response function will thus be able to cover incident gamma radiation of any energy E within a range close to [59 keV; 1836 keV].

A method similar to the one described in step 20 can be used to generate $f(\lambda, X)$.

Factor loadings $\lambda$ are for example estimated for energies ranging from 40 keV to 2048 keV with step 2 keV using factor analysis and interpolation, as described above in steps 250 and 252.

Figure 5:
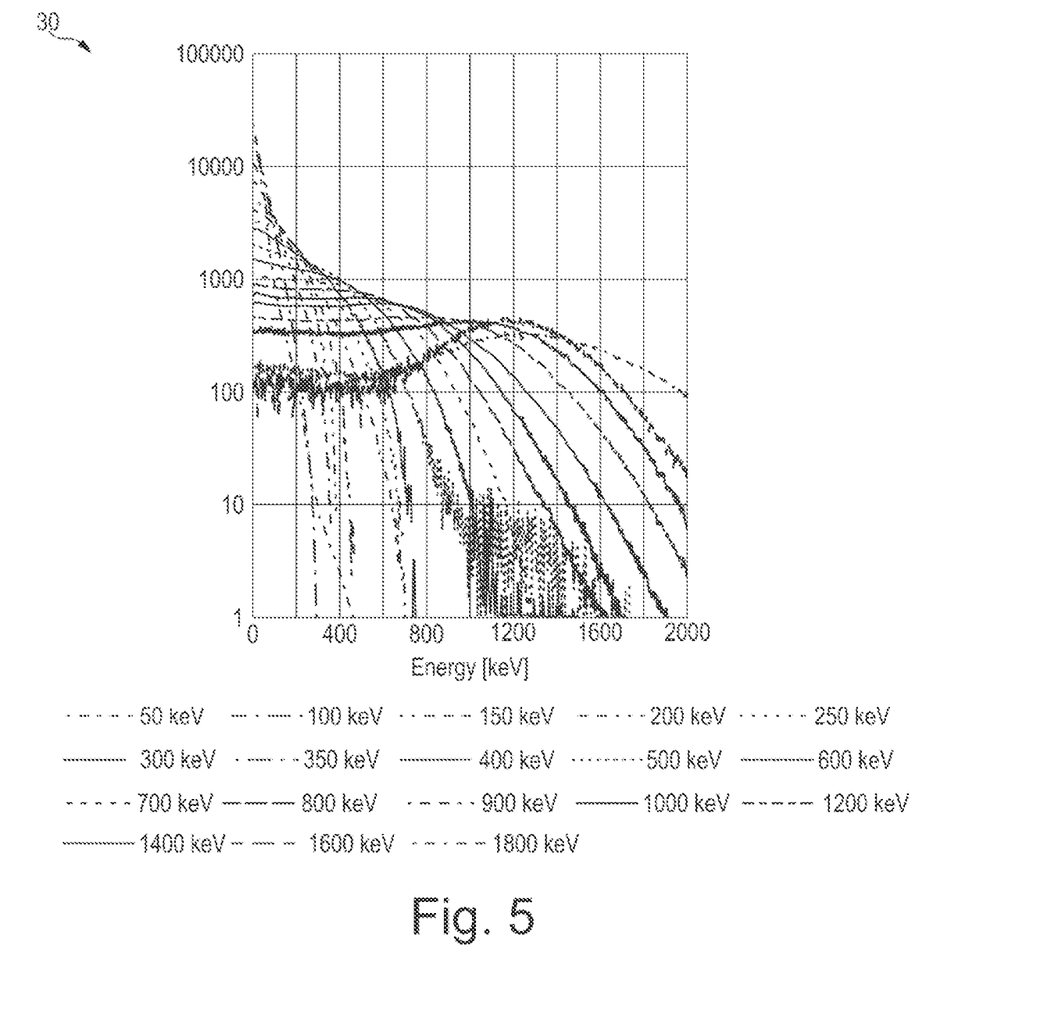
FIG. 5 is a graph illustrating an example of response function that can be obtained in the last step of the method of FIG. 1.

The model components X are then estimated for each value of energy E by regression analysis of the primary responses $\{S_{ij}\}$, as described in step 254, The spectrum representing the response of the scintillator to an incident radiation of energy E can then be constructed, as illustrated in FIG. 5 for various discrete energy values. Naturally, the invention is not limited to these values of energy, and the response to a gamma radiation of any energy E within the range considered can be computed using this method.

Each radiation detector has a specific response function $f(\lambda, X)$, which is generated before using the detector for radionuclide detection or identification.

Figure 6:
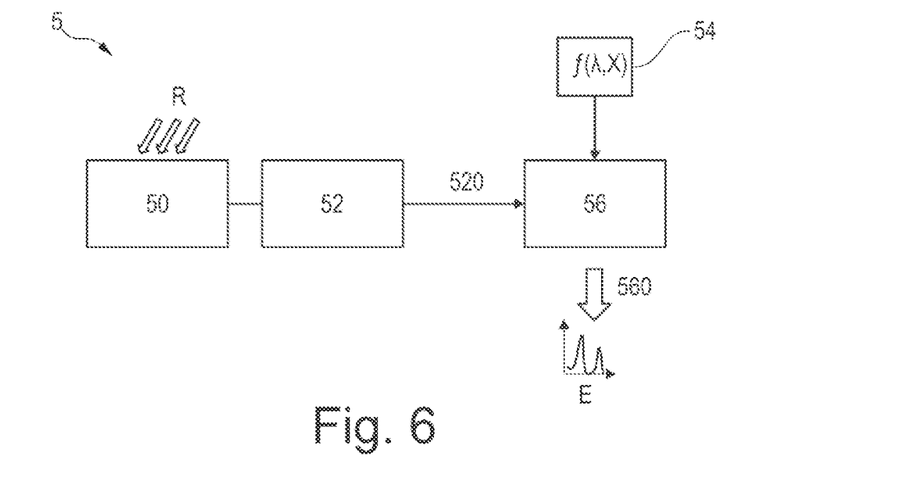
FIG. 6 shows a simplified schematic representation of a radiation detector in accordance with the invention.

A radiation detector 5 according to the invention is represented in a simplified and schematic manner in FIG. 6.

The radiation detector comprises a sensor 50 comprising a plastic scintillation material and a photodetector 52 connected to the sensor 50, arranged to detect the photons produced by the scintillation material when exposed to incident gamma radiation R.

The photodetector 51 generates a signal 520 representative of the response of the detector to the incident radiation which is received by a processor 56.

A response function $f(\lambda, X)$ of the detector 5 is for instance stored in a memory 54.

The processor 56 uses the response function to treat the signal 520, for example by a deconvolution process, and generate a deconvoluted signal 560 representative of the energy distribution of the incident gamma radiation.

The deconvolution process mentioned above is an algorithm-based process known from prior art. For instance, MLEM algorithm can be used to generate the deconvoluted signal, as described in the paper from Meng, Ling-Jian and David Ramsden. "An inter-comparison of three spectral-deconvolution algorithms for gamma-ray spectroscopy." (*IEEE Transactions on Nuclear Science* 47.4 (2000): 1329-1336.).

The precision of the deconvolution process and whether the deconvoluted signal is accurate enough to help identifying isotopes in the source of radiation, depends on the accuracy of the response function.

Figure 7:
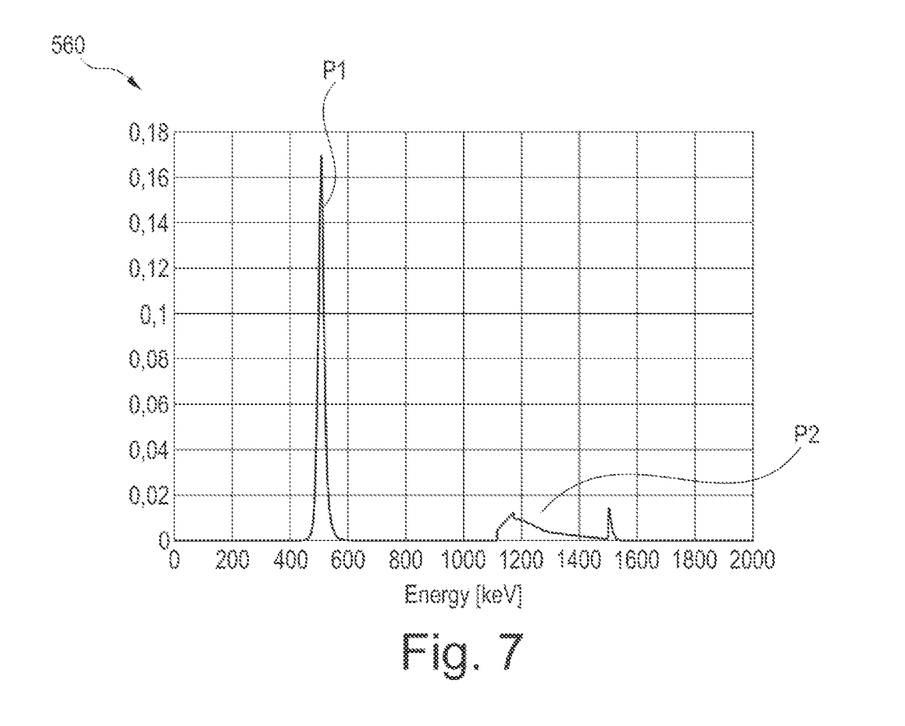
FIG. 7 is a graph illustrating an example of the energy distribution of an incident gamma radiation determined by deconvolution of a measured response of a radiation detector.
Figure 8:
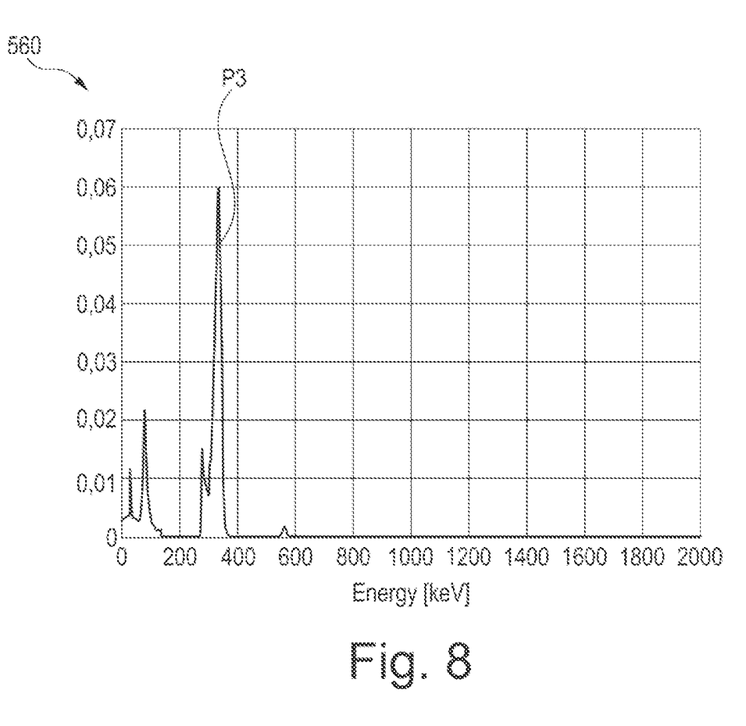
FIG. 8 is a graph illustrating another example of the energy distribution of an incident gamma radiation obtained by deconvolution of a measured response of a radiation detector, and FIG. 9 (already described) is a graph illustrating an example of response function of an inorganic NaI(Tl) detector.

Examples of deconvoluted signals 560 are shown in FIGS. 7 and 8 when the detector 5 is exposed to radiation emitted by radionuclides $^{22}$Na and $^{133}$Ba, respectively. As mentioned before and described in Table 1, these two radionuclides present multiple energy lines, meaning gamma rays with different values of energy are emitted following up a decay event.

The signal 560 from $^{22}$Na shown in FIG. 7 has been deconvoluted from the initial response or measured spectrum $S_7$ shown in FIG. 2 using the response function $f(\lambda, X)$ described above.

As it can been seen in FIG. 2, the measured spectrum $S_7$ does not shown any significant energy peak that would help identify radionuclide $^{22}$Na.

On the other hand, the deconvoluted signal 560 shown in FIG. 7 shows a distinct energy peak P1 centered around 510 keV, and a smaller but distinct variation of energy P2 between 1100 and 1500 keV.

The radiation source $^{22}$Na, which has two energy lines at 511 keV and 1274.5 keV with yields of 180.7% and 99.9%, respectively, can thus be easily identified when looking at the deconvoluted signal 560.

Similarly, the signal 560 from $^{133}$Ba shown in FIG. 8 has been deconvoluted from the initial response or measured spectrum $S_2$ shown in FIG. 2 using the response function $f(\lambda, X)$ described above.

The deconvoluted signal 560 shows multiple peaks between 0 and 400 keV, centered around the expected values of energy for $^{133}$Ba (energy lines at 79.6, 81, 276.4, 302.8, 356 and 383.9), the peaks height being proportional to the yield. The highest peak P3, for example, is centered around 356 keV which corresponds to the highest yield of 60%.

The above examples merely illustrate possible embodiments of various aspects of the present disclosure and are not intended to be limiting; other aspects and embodiments will be apparent to those skilled in the art.

For example, the method for generating the response function can be applied to other types of scintillators than just plastic scintillators.

Any other known radionuclide can be used in the plurality of radionuclides, not only the ones considered in the above examples.

The invention claimed is:

1. A method for generating a response function of a scintillator to incident gamma rays of energy within a range of energies of interest, the method comprising:
   (a) obtaining the responses $\{S_i\}$ of the scintillator to a plurality of known radionuclides i (i=1, ... N), each radionuclide i emitting gamma rays with known energetic properties ($E_{ij}$, $Y_{ij}$),
   (b) decomposing, for each radionuclide i, the response $S_i$ into primary responses of the scintillator $S_{ij}=f(\lambda_{ij}, Y_{ij}, X_{ij})$, each primary response corresponding to the response of the scintillator to a received gamma ray of a known energy $E_{ij}$ for this radionuclide i,
   (c) deriving from the primary responses $\{S_{ij}\}$ the response function $f(\lambda, X)$ of the scintillator to an incident gamma ray of any energy E within the range of energies of interest.

2. The method according to claim 1, wherein the known energetic properties of the gamma rays of a radionuclide i comprise possible values of energy $E_{ij}$ at which the gamma rays can be emitted, and for each energy value $E_{ij}$, the corresponding yield $Y_{ij}$.

3. The method according to claim 1, wherein the plurality of known radionuclides is chosen as to obtain after step (b) at least 15 different primary responses $\{S_{ij}\}$ of the scintillator.

4. The method according to claim 1, wherein the response $\{S_i\}$ being decomposed at step (b) through a factor analysis method.

5. The method according to claim 1, wherein the decomposition of the responses $\{S_i\}$ in step (b) comprising:
   via factor analysis, determining, for each monoenergetic or pseudo-monoenergetic radionuclide i of the plurality of radionuclides, at least one correlation coefficient $\lambda_i$ between the response $S_i$ of the scintillator to the radionuclide i and the factors, $\lambda_i$, depending on the energy $E_i$ at which gamma rays are emitted by the radionuclide i,
   computing, by interpolation of the coefficients $\{\lambda_i\}$, at least one correlation coefficient $\lambda_{ij}$ for each value of energy $E_{ij}$ at which gamma rays are emitted by a radionuclide i, where j=1, ... , P with P being the number of possible values of energies for radionuclide i,
   determining, for each radionuclide i and energy j at least one model component $X_{ij}$ representing the response of the scintillator for each value of energy $E_{ij}$ at which gamma rays are emitted by a radionuclide i, $X_{ij}$ being preferentially determined by regression analysis of the responses of the scintillator to monoenergetic or pseudo-monoenergetic radionuclides and/or other primary responses with similar energy, determining, for each radionuclide i, from coefficients $\lambda_{ij}$, the decomposition of the signal $S_i$ into primary responses $S_{ij}=f(\lambda_{ij}, Y_{ij}, X_{ij})$.

6. The method according to claim 5, wherein M correlation coefficients $\{\lambda_{ij,k}:k=1, ... , M\}$ being determined for each value of energy $E_{ij}$ at which gamma rays are emitted by a radionuclide i, M being greater than 1.

7. The method according to claim 1, wherein the response function $f$ being determined in step (c) using a factor analysis method.

8. The method according to claim 1, wherein at least one response $S_i$ being obtained in step (a) through direct experimental measurement.

9. The method according to claim 1, wherein the range of energies of interest is larger than [60 keV-1500 keV].

10. A method for determining the energy distribution of an incident gamma radiation, the method comprising:
    providing a plastic scintillator comprising a response function determined beforehand according to the method described claim 1,
    measuring the response of the scintillator when exposed to the incident gamma radiation,
    performing a deconvolution of the measured response using the response function of the scintillator, the deconvolution process generating an output energy spectrum representative of the energy distribution of the gamma radiation.

11. The method according to claim 10, comprising identifying at least one radionuclide present in the source of the incident gamma radiation based on at least one peak of the output energy spectrum representative of an energy value at which the incident gamma radiation can be emitted for the at least one radionuclide.

12. A radiation detector (5) comprising:
    a sensor comprising a plastic scintillator producing photons when interacting with gamma radiation,
    at least one photodetector arranged to detect the photons produced by the plastic scintillator and generate a signal representative of the response of the detector to the gamma radiation,
    a memory storing data representative of a response function $f(\lambda, X)$ of the scintillator, response function resulting from the method defined claim 1, and,
    a processor using said data to perform a deconvolution of the signal received by the photodetector and generate a deconvoluted signal representative of the energy distribution of the gamma radiation.

* * * * *